Jan. 20, 1925.

J. L. FRUIN 1,523,949

BATHTUB DRAIN

Filed Nov. 3, 1922

Witness:
A. J. Sauser.

Inventor:
John L. Fruin,
By Samuel N. Pond,
Atty

Jan. 20, 1925.
J. L. FRUIN
1,523,949
BATHTUB DRAIN
Filed Nov. 3, 1922  2 Sheets-Sheet 2
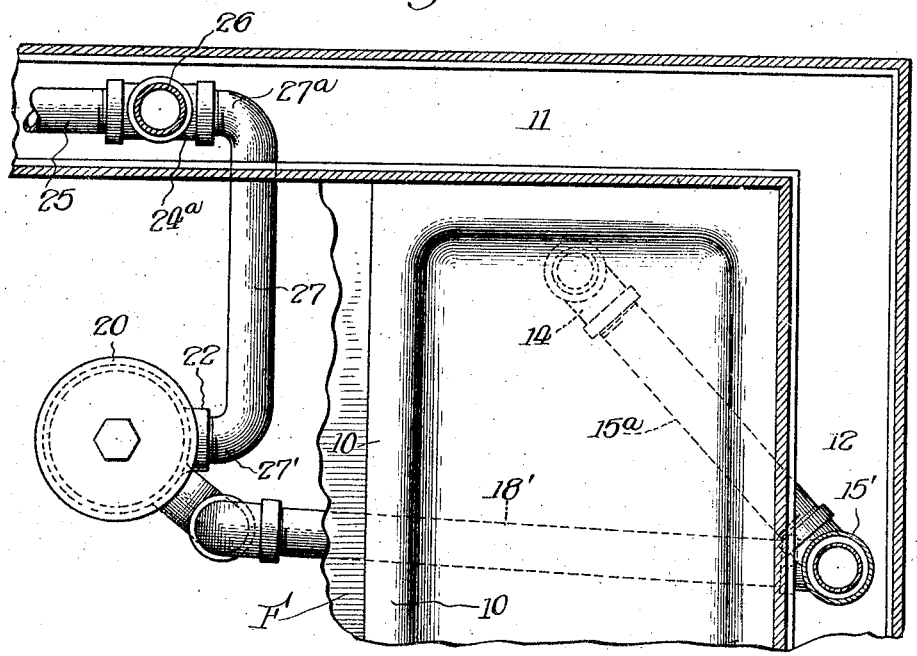
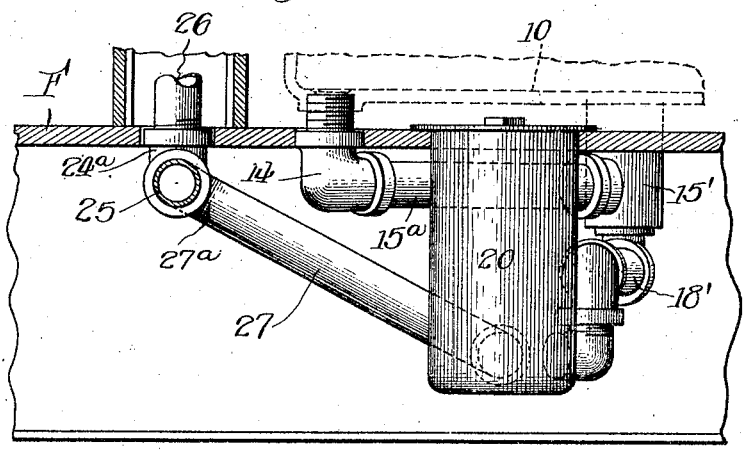
Witness:
A. J. Sauser.
Inventor:
John L. Fruin,
By Samuel N. Pond,
Atty.

Patented Jan. 20, 1925.

1,523,949

UNITED STATES PATENT OFFICE.

JOHN L. FRUIN, OF CHICAGO, ILLINOIS; ROBERT E. FRUIN EXECUTOR OF THE SAID JOHN L. FRUIN, DECEASED.

BATHTUB DRAIN.

Application filed November 3, 1922. Serial No. 598,719.

*To all whom it may concern:*

Be it known that I, JOHN L. FRUIN, a citizen of the United States, residing at Chicago, in the county of Cook and State of Illinois, have invented certain new and useful Improvements in Bathtub Drains, of which the following is a specification.

This invention relates to the art of plumbing, and has reference more particularly to an improved construction of bathtub drain.

The drain line of modern bathtubs is located within the vertical height of the floor of the bathroom, and commonly includes what is known as a drum trap to maintain a seal, and this trap commonly has the lid or cap which closes its upper end disposed substantially flush with the top surface of the flooring. This drum trap and the drain line leading therefrom to the soil stack are installed before the flooring is laid; and it not infrequently happens that when the flooring is laid the upper end of the drum trap is either above or below the top surface of the floor, and it is impossible to readjust the drum trap to the required position without taking down and refitting the pipe line connections therefrom to the soil stack.

One object of my present invention is to provide a drain line for the bathtub of such a character that, after the trap and its pipe line to the soil stack have been installed, the trap can be bodily adjusted in a vertical direction to bring its upper end flush with the floor surface without the necessity of taking down and refitting the drain line extending therefrom to the soil pipe.

As is well known, bathtubs are commonly located in one corner of the bathroom, and those of the built-in type frequently extend lengthwise between two opposite walls. The drain outlet extends from one end of the tub to a controlling valve housed within one of the end walls or the side wall adjacent to the tub; and from this control valve the drain line extends within the vertical space of the floor into the drum trap. Heretofore, owing to structural features of the drum trap, including horizontal inlets and outlets at diametrically opposite points, this drain line from the controlling valve to the drum trap has been fixed and incapable of adjustment as to direction. Mainfestly, a drum trap so constructed as to be capable of receiving the drain pipe from a control valve located at any point in either end wall or in the side wall presents a manifest practical advantage; and another object of the present invention is to provide a trap of this character capable of receiving the drain line from the control valve located at any point in the wall or walls adjacent to the bathtub.

A still further object of the invention is to provide a drain system for a bathtub which will require less space for its installation than heretofore, and will thus present an advantage for small bathrooms where the space for the several fixtures and the plumbing installation serving the same is limited.

Other objects and advantages of the invention will be apparent to plumbers and others skilled in the art from the following detailed description, taken in connection with the accompanying drawings wherein I have illustrated two practical embodiments of the principle of the invention, and in which—

Figure 1:
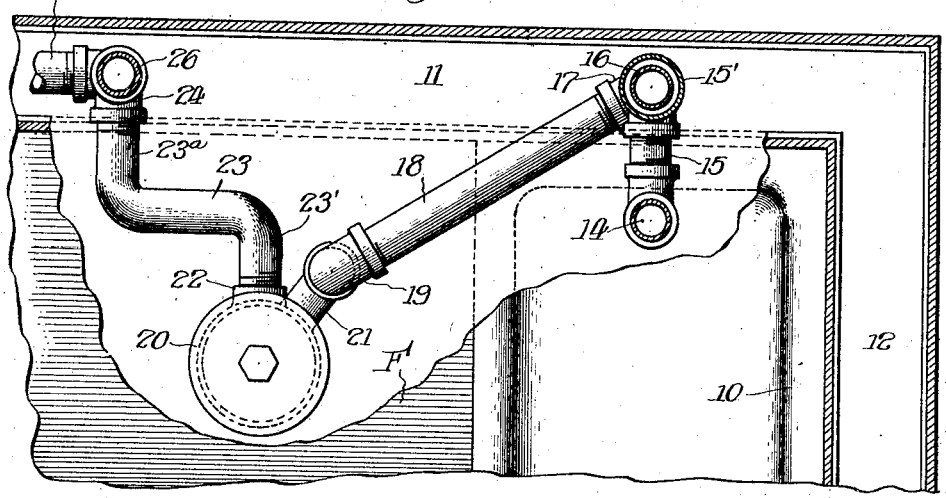
Fig. 1 is a top plan view of a corner portion of a bathroom, in horizontal section through the walls, and with the flooring broken out, and showing my improved bathtub drain installed therein.
Figure 2:
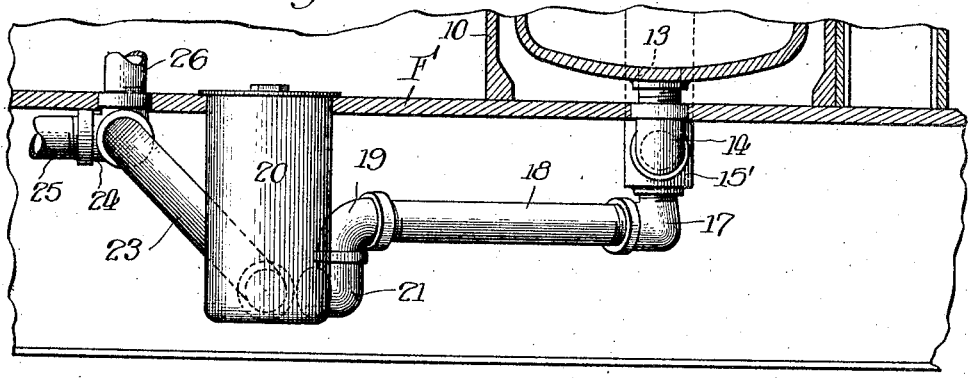
Fig. 2 is a vertical section through the same, as viewed from the bottom and side of Fig. 1.
Figure 3:
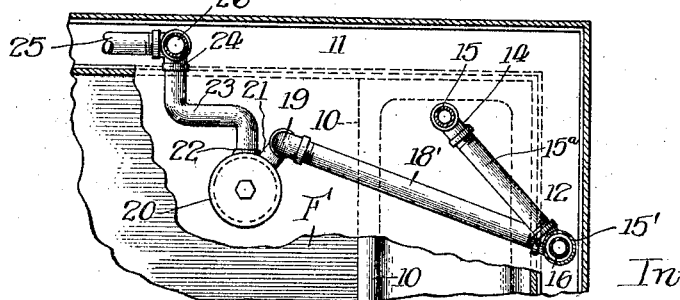

Fig. 3 is a view similar to Fig. 1 on a reduced scale illustrating a drain line from the outlet of the bathtub to the drum wherein the control valve is located in a side wall adjacent to one side of the tub; and Figs. 4 and 5 are views similar to Figs. 1 and 2, respectively, illustrating a slightly modified arrangement of the drum trap and its lead to the drain pipe within the wall which extends to the soil pipe.

Referring first to Figs. 1 and 2, 10 designates a bathtub of the built-in type, one end of which lies against a wall 11 of the bathroom, while one longitudinal side thereof lies against another wall 12 that, with the wall 11, forms one corner of the room. At one end of the bathtub is the usual drain opening 13, through which, an elbow 14, and a short horizontal pipe 15, the waste flows into a valve housing 15′ containing the usual tubular overflow valve indicated at 16 that limits the height of the water in the tub to prevent accidental overflow, and is usually actuated by a knob in the wall and an eccentric and link connection to the valve.

Fitted into the bottom of the valve housing 15' is an elbow 17, from which a straight pipe section 18 leads into a downwardly turned elbow 19. 20 designates the drum trap, which is provided at its lower end with a preferably integral laterally extending upwardly turned elbow 21, threaded at its upper end to receive the lower end of the downwardly turned elbow coupling 19, thereby completing the drain line from the bathtub to the drum. Adjacent to the elbow 21 and preferably at the same level is a tapped boss 22 on the side of the drum surrounding a lateral opening the axis of which is approximately forty-five degrees from the axis of the horizontal arm of the elbow 21. Into the boss 22 is screwed one end 23' of a Z-shaped pipe 23, the oppositely extending other end 23ª of which is screwed into a union 24 within the wall 11 which in turn is connected to a horizontal pipe 25 leading to the main soil stack (not shown) and a vertical vent pipe 26. By reference to Fig. 2 it will be seen that the pipe 23 as a whole is inclined upwardly from its connection to the drum 20, thereby insuring a water seal in the drum at the level of the bottom of pipe 25.

Since the joints of the pipe 23 with the drum 20 and the union 24 have parallel horizontal axes, it will be seen that the drum can readily be adjusted upwardly or downwardly so as to bring its upper end exactly flush with the flooring F that is later fitted around the upper end of the drum. Since the tub itself is not in place at the time the flooring is laid, this adjustment of the drum to the floor level does not require any adjustment or alteration of the connections from the bottom of the tub to the drum, the height of these connections remaining constant by reason of the fact that the distance from the top surface of the flooring to the bottom of the drum is always constant.

In Fig. 3 I show an embodiment of the invention for a situation where the control valve is located in the side wall 12 of the bathroom opposite one longitudinal side of the tub. In this case pipes 15ª and 18', identical in function with the pipes 15 and 18 are employed, but differing only in length and direction to conduct the waste from the outlet of the tub to the valve casing 15' and thence to the drum. The different angular position of the pipe 18' is possible by reason of the fact that the elbow coupling 19 can swing on its vertical axis to any direction required for the pipe lines 18 and 18'. Manifestly, if the control valve is located in the opposite end wall from that shown in Fig. 1, the elbow coupling 19 can be swung still further in a clockwise direction to accommodate the pipe line leading therefrom to said end wall.

In Figs. 4 and 5 I show an arrangement wherein the drum 20 is turned clockwise through an angle of ninety degrees, and the union 24ª, instead of having rectangularly disposed horizontal branches to receive the pipes 23 and 25, has a pair of oppositely extending branches, one of which receives the pipe 25 leading to the soil stack and the other of which receives one end 27ª of a U-shaped pipe 27, the other end 27' of which is connected into the tapped boss 22 of the drum. The connections from the drum to the outlet of the bathtub are the same as those shown in Fig. 3, the control valve being shown as located in the side wall 12; but manifestly, with the drum in the position shown in Fig. 4, the lead therefrom can extend equally well to a control valve located in either end wall. It is here noted that, by connecting the pipe 18 or 18' to the drum through an elbow coupling that is capable of swinging on a vertical axis, the construction adapts itself to installations where the control valve is located anywhere or at any point in the side wall or in either end wall, and is thus universal in respect to this feature. It is further noted that the arrangement shown in Figs. 4 and 5 allows of a more compact plumbing system for the several bathroom fixtures, since the bath drain vent pipe 26, the vent pipes of the other fixtures, and the soil stack itself can all be set in the wall 11 nearer to the bathtub, without locating the drum beneath the bathtub, (which is impracticable) than is possible in installations employing the usual drum trap with diametrically opposite openings leading to the bathtub drain opening and the soil stack, respectively. The chief advantage of the invention, however, resides in the fact that it permits vertical adjustment either up or down to the floor level after it has been connected up to the vent and coil stacks without requiring any taking down or alteration of the connections.

I claim—

1. In a bathtub drain, the combination with a drum trap and a dsicharge line both having openings formed on parallel horizontal axes, of a pipe extending between and at its opposite end connected to said openings respectively with capacity of swiveling movement whereby said drum is capable of being adjusted bodily up and down, and a pipe connecting said drum trap with the waste outlet of the bathtub.

2. In a bathtub drain, the combination of a discharge line having a horizontal opening, a drum trap having a horizontal opening whose axis is parallel to and at a lower level than the axis of said discharge line opening, an inclined pipe formed with parallel end portions connected to said openings respectively with capacity of swiveling movement whereby said drum may be adjusted bodily up and down, and a pipe connecting said drum trap with the waste outlet of the bathtub.

3. In a bathtub drain, the combination of a discharge line having a horizontal tapped opening, a drum trap having a horizontal tapped opening whose axis is parallel to the axis of said discharge line opening, a pipe formed with threaded end portions extending at right angles to its intermediate portion and screwed into said tapped openings, and a pipe connecting said drum trap with the waste outlet of the bathtub.

4. In a bathtub drain, the combination with a drum trap having a radial inlet branch, of a pipe connecting said branch with a control valve of a bathtub, said pipe being connected to said branch by a vertical swivel joint whereby it is capable of assuming any one of various angular positions relatively to said branch.

5. In a bathtub drain, the combination with a drum trap having a radial inlet branch with an upturned end, of a pipe leading from a control valve of the bathtub and having a downturned end pivotally jointed to the upturned end of said inlet branch, whereby said pipe is capable of assuming any one of various angular positions relatively to said branch.

JOHN L. FRUIN.